(12) United States Patent
Andersson et al.

(10) Patent No.: US 6,578,910 B2
(45) Date of Patent: Jun. 17, 2003

(54) VENTILATION SEAT

(75) Inventors: Christer Andersson, Trollhättan (SE); Bengt Andreasson, Trollhättan (SE); Harry Eriksson, Trollhättan (SE)

(73) Assignee: Lear Corporation, Southfield, MI (US)

( * ) Notice: Subject to any disclaimer, the term of this patent is extended or adjusted under 35 U.S.C. 154(b) by 8 days.

(21) Appl. No.: 09/793,177

(22) Filed: Feb. 26, 2001

(65) Prior Publication Data

US 2001/0035669 A1 Nov. 1, 2001

(30) Foreign Application Priority Data

Mar. 2, 2000 (SE) .............................................. 0000679

(51) Int. Cl.$^7$ ................................................ A47C 7/74
(52) U.S. Cl. ............................ 297/180.11; 297/180.13; 297/180.14
(58) Field of Search .................... 297/180.13, 180.1, 297/180.14; 5/421, 423

(56) References Cited

U.S. PATENT DOCUMENTS

| 3,506,308 A | | 4/1970 | Fenton | |
|---|---|---|---|---|
| 4,391,009 A | * | 7/1983 | Schild et al. | 297/180.13 X |
| 5,927,817 A | | 7/1999 | Ekman et al. | 297/180.14 X |
| 6,003,950 A | | 12/1999 | Larsson | 297/180.13 X |
| 6,109,688 A | * | 8/2000 | Wurz et al. | 297/180.13 X |
| 6,179,706 B1 | * | 1/2001 | Yoshinori et al. | 297/180.14 X |

FOREIGN PATENT DOCUMENTS

GB 957135 5/1964

OTHER PUBLICATIONS

PCT International Search Report (4 sheets).

* cited by examiner

Primary Examiner—Peter M. Cuomo
Assistant Examiner—Rodney B. White
(74) Attorney, Agent, or Firm—Bill C. Panagos

(57) ABSTRACT

A vehicle seat having a ventilation system includes a network of ducts within the seat bottom, and a fan for moving air away from the seat surface. The ventilation system is configured such that a single fan may selectively move air through some or all of the ducts. Before a vehicle occupant sits in a seat, air is moved through all of the ducts to reduce the temperature at the seat surface. When the occupant sits in the seat, certain ducts in the network are closed to air flow. The air flow is now limited to the remaining ducts, which allows for efficient removal of moisture from the seat surface. After the temperature and moisture at the seat surface have reached desired levels, the speed of the fan is reduced to ensure that the occupant does not experience an unpleasant draught.

20 Claims, 3 Drawing Sheets

VENTILATION SEAT

TECHNICAL FIELD

The present invention relates to a vehicle seat having two seat parts, namely a seat bottom and a backrest, at least one of the seat parts comprising a ventilation system. The invention further relates to a method for comfort ventilation of a vehicle seat.

BACKGROUND

In the automotive industry, sitting comfort and driving comfort is an important field. Special problems arise in a warm and sunny climate, as the interior of a parked vehicle can reach very high temperatures. It goes without saying that this affects the temperature of the car seats, which can get very hot, in particular if the covering is dark. As a consequence, a person entering the vehicle may burn himself when sitting down on the vehicle seat. Moreover, there is further discomfort at an initial stage, since the driver is probably perspiring after having been outside in the hot climate. Thus, it is important to lead away the moisture from the surface of the seat. At the same time, the draught must not be too strong as this may have a detrimental effect on the driver's/the passenger's health.

A number of devices of the type mentioned by way of introduction are already known. For instance, mention can be made of devices comprising a plurality of fans which are arranged in the seat and distributed over a large surface. This is a very expensive solution, which is sensitive to strain, in particular due to the control electronics which has to be integrated in the seat bottom to control the fans. Other solutions comprise a number of sensors and the like in the seat bottom to control the power of the fans and the like, but these systems also require electronics integrated in the seat bottom and are thus sensitive.

OBJECT OF THE INVENTION

Therefore, it is an object of the invention to provide a ventilation system for a car seat, said system obviating the above-mentioned problems and having a simple design, at the same time as the system does not have a detrimental effect on the driver's/passenger's health.

SUMMARY OF THE INVENTION

According to the invention, the above-mentioned object is achieved by means of a ventilation system, which comprises a network of ducts, a subset of these ducts being at least partially closable with a view to permitting redirecting of air flows in the seat part. This permits a change of the cooling and moisture-removing capability of the seat cushion, without any direct regulation by means of fans and the like.

Preferably, said network of ducts comprises ducts extending substantially in the planar direction of the seat part as well as substantially in the thickness direction of the seat part, which permits a satisfactory removal of heat (ducts in the thickness direction) and moisture (ducts in the planar direction).

Furthermore, said network of ducts suitably comprises one or more branch ducts extending substantially in the thickness direction and through substantially the entire seat part. These ducts are suitably located centrally in the seat.

Said network of ducts further comprises an additional number of joint ducts which extend substantially in the thickness direction of the seat part and which constitute said at least partially closable ducts. These joint ducts end at the sitting surface of the seat, and the orifices of these joint ducts can be spread over the sitting surface in such manner that a satisfactory and quick cooling is provided. Moreover, the partially closable joint ducts are connected, in their ends facing away from the sitting surface of the seat part, with at least one of said branch ducts via connection ducts extending substantially in the planar direction. As a result, air can be conveyed from the upper side of the seat, via branch ducts and the closable joint ducts, to be gathered in the branch ducts for a common discharge of all air through the same.

Suitably, a fan element is also arranged in fluid contact with said branch ducts on the side of the seat part opposite to the sitting surface of the seat part. This fan element is suitably of a one-way type and exhausts air from the sitting surface of the seat part through said network of ducts and to the opposite side of the seat part. This arrangement permits an efficient flow of air through the network of ducts and provides cooling over a large surface of the seat by means of only one fan element thanks to the above-mentioned distribution of the orifices of the joint ducts over the sitting surface.

Preferably, the network comprises a number of ducts distributed at least along the sitting surface of the seat part, one end of these ducts ending in at least one of said branch ducts, the ends of said at least partially closable joint ducts facing the sitting surface of the seat part ending in one of said surface ducts. Furthermore, the seat part suitably has a perforated or otherwise permeable surface layer extending over substantially the entire sitting surface of the seat part. As a result, air as well as moisture, for instance sweat, can penetrate the surface layer of the seat part and into the surface ducts, whereupon air and moisture are conveyed to one of the branch ducts.

Moreover, the seat part is suitably made of cellular plastic or the like, the area of said surface ducts being made of a rigid material and the area of said at least partially closable joint ducts and said connection ducts being made of a comparatively softer material, said connection ducts being at least partially compressed when applying a load to the seat part. This compression results in the above-mentioned closing capability of a subset of the ducts and stops at least partially the air flow in the same. This closability can also be provided by arranging valve means in said at least partially closable joint ducts.

The above-mentioned objects are also achieved by a method for comfort ventilation comprising the steps of starting by remote control a fan element which is arranged in connection with the seat part, generating by means of said fan element (6) a flow of air through a network of ducts (2, 3, 4, 5) which is arranged in the seat part and whose orifices are distributed over the sitting surface, and closing at least partially a subset of said ducts, and thus redirecting the air flow through the seat part when applying a load to the seat part. Thus, this method makes it possible to pre-cool the seat part before the driver/passenger sits down in the vehicle, after which a change takes place from a cooling phase to a moisture-removing phase the moment the driver/passenger sits down in the vehicle.

Suitably, the step of completely or partially closing certain ducts is carried out by compressing the seat part when applying a load, thereby causing mechanical changes in the structure of the seat bottom. Preferably, the step of at least partially closing a subset of ducts is carried out by compressing connection ducts arranged in the seat part when applying a load. This is a purely mechanical and very simple structure, which eliminates the need of sensors and the like for this purpose. In addition, it is ensured that the transition between the various phases takes place the moment the driver/passenger first applies a load to the seat part.

Furthermore, the step of generating by means of said fan element a flow of air through a network of ducts arranged in the seat part consists in exhausting air from the sitting surface of the seat part, through said network of ducts, whose orifices are distributed over the sitting surface, to the opposite side of the seat part. Preferably, the method also comprises the step of varying the speed of the fan after the closing step to generate a comfortable air flow through the seat part.

Finally, the step of starting the fan element by remote control can be carried out by the start function of the fan being connected, for instance, to the remote key of the vehicle, the vehicle door handle, alarm device or the like, depending of what is considered to be suitable.

BRIEF DESCRIPTION OF THE DRAWINGS

Below, the invention will be described in more detail with reference to the accompanying drawings.

DESCRIPTION OF PREFERRED EMBODIMENTS

Figure 1:
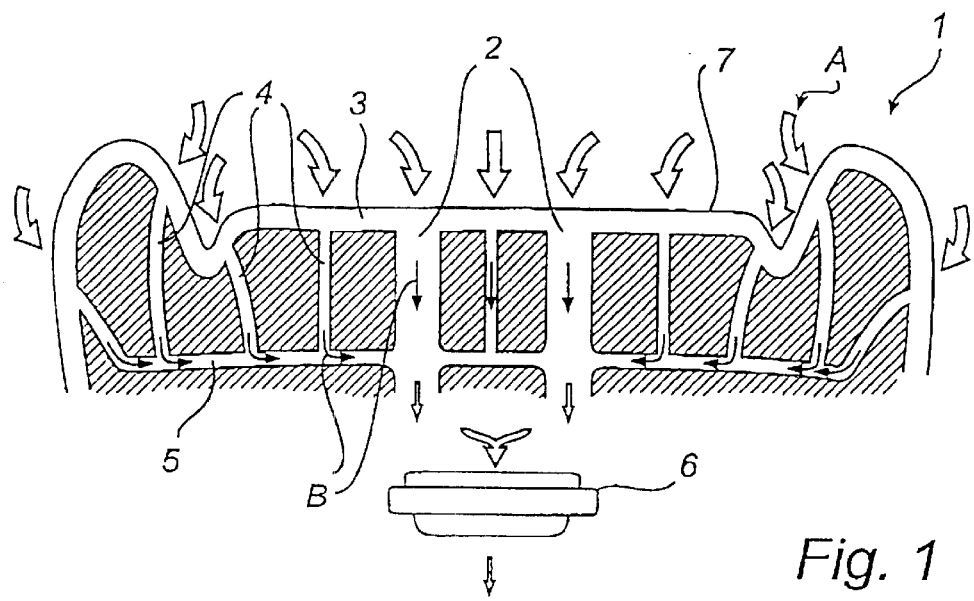
FIG. 1 is a front cross-sectional view of a seat bottom in a vehicle seat in an unloaded condition in a first phase.
Figure 2:
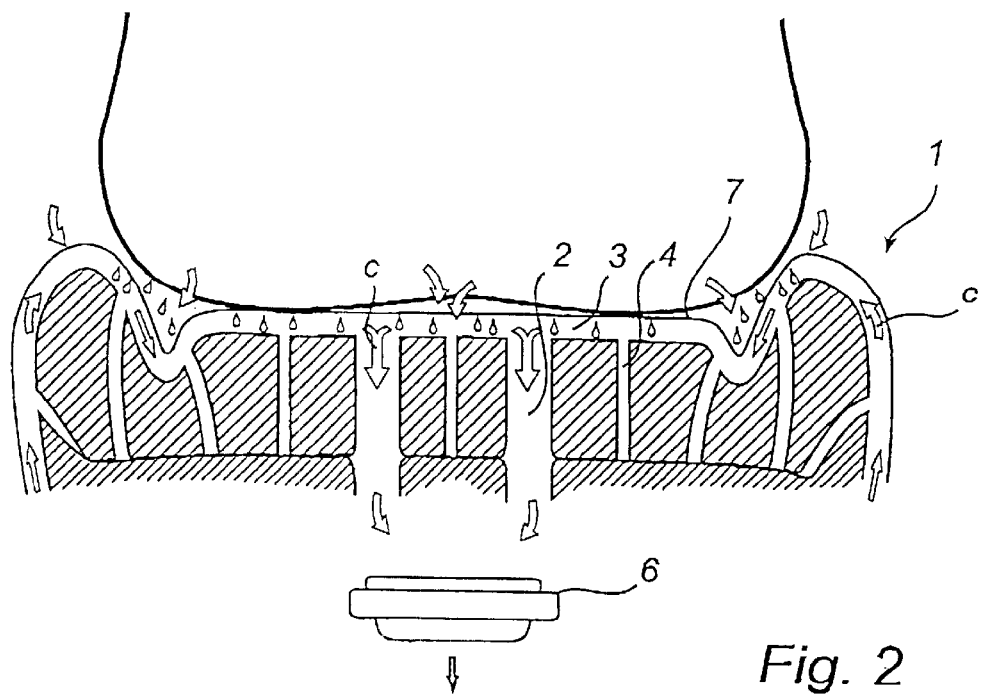
FIG. 2 is a front cross-sectional view of a seat bottom in a vehicle seat in a state when a load is applied in a second phase.
Figure 3:
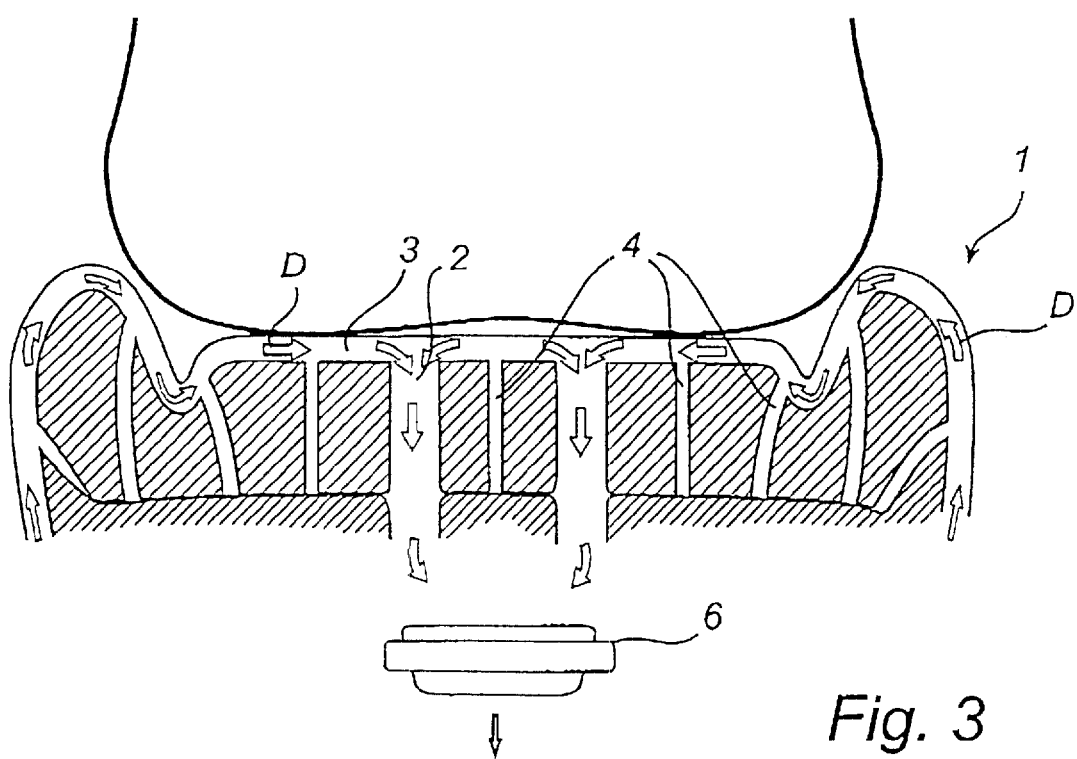
FIG. 3 is a front cross-sectional view of a seat bottom in a vehicle seat in a state when a load is applied in a third phase.

FIGS. 1, 2 and 3 show a part of a car seat in cross-section. In these Figures, the seat part is a seat bottom 1, but the invention could just as well be applied to the backrest of the seat. The seat bottom has a network of ducts 2, 3, 4, 5, which cross the seat bottom 1 in a number of different directions. In this embodiment, there is a number (two are shown) of branch ducts 2, which are located in the middle portion of the seat bottom. These branch ducts 2 have a comparatively large diameter and cross substantially the entire seat bottom 1 in its thickness direction. In direct connection with these branch ducts, on the underside of the seat bottom, a fan is arranged, which can exhaust air through the seat bottom, preferably from the upper side of the seat bottom to its underside. The surface of the seat bottom is covered by a permeable layer 7. This layer should be permeable to both moisture and air and can, for instance, be a layer of textile, perforated leather or the like. Along the upper side of the seat bottom cushion and suitably also around the side edges of the seat bottom, a number of surface ducts 3 are formed. These ducts are suitably evenly distributed over the seat bottom and can, for instance, be arranged in solar shape, each of the surface ducts 3, in one of its ends, ending in one of said branch ducts 2. The area of these surface ducts is formed of a cellular plastic material or the like, which is harder than the material of which the underlying area is formed. The seat bottom further has a number of joint ducts 4 extending in the thickness direction of the seat bottom. They are substantially directed in the same direction as the branch ducts 2, but they suitably have a smaller cross-section. The joint ducts 4 suitably end in said surface ducts 3 and are suitably well distributed over the sitting surface of the seat bottom 1. The joint ducts 4 end in their other ends in connection ducts 5, which in this embodiment each connect a number of the joint ducts 4 with at least one of the branch ducts 2. The area of the joint ducts 4, the connection ducts 5 and the branch ducts 2 is, as previously mentioned, made of a softer material than the area around the surface ducts 3.

When the seat bottom is in an unloaded condition, as shown in FIG. 1, the fan 6 exhausts air from the upper side of the seat bottom, as indicated by the arrows A, through the permeable surface layer 7 into the surface ducts 3, further on to the closest, in this case, substantially vertical duct, i.e. branch duct 2 or joint duct 4, as indicated by the small arrows B, the air passing through the joint ducts 4 being discharged in a connection duct 5, and subsequently in a branch duct 2, whereupon all air is drawn off under the seat bottom 1 through the branch ducts 2. By absorbing air over substantially the entire surface of the seat bottom 1, a very efficient cooling is provided (see temperature phase in FIG. 1) of the car seat, when the latter has a high initial temperature. This cooling is initiated as soon as the fan 6 starts. Therefore, this fan is suitably controlled remotely, so that the fan starts a suitable period of time before a driver/passenger sits down on the seat. Thus, the start function of the fan can be remote-controlled and, for instance, connected to the remote-controlled unlocking of the vehicle. This is referred to as the temperature phase and it lasts until the driver/passenger sits down on the seat.

Figure 4:
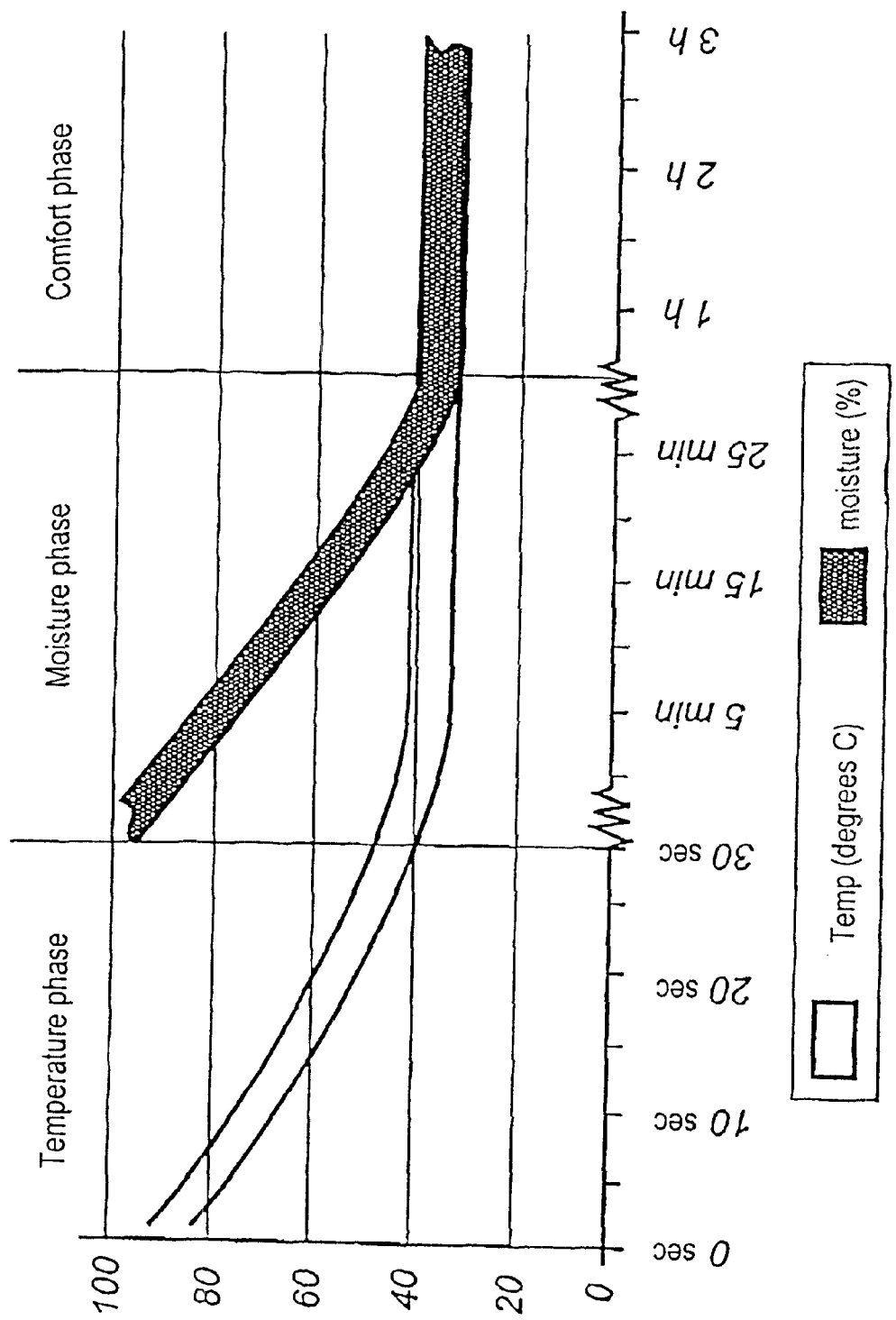
FIG. 4 is a schematic diagram of heat removal and moisture removal as functions of time.

FIG. 2 shows the situation when a driver/passenger has just seated himself on the seat. Due to the design of the ducts and due to the fact that the material around the surface ducts 3 is harder than around the connection ducts 5, the connection ducts 5 are compressed, as shown in FIG. 2. This compression completely or partly prevents air from being conveyed through the connection ducts 5 and consequently through the joint ducts 4, which end in the connection ducts 5. As a result, a greater air flow is provided along the sitting surface of the seat, through said surface ducts 3, which end in one of the branch ducts 2, whereupon the air is exhausted by means of the fan 6. This flow is indicated by arrows C in FIG. 2. In addition, the driver/passenger is probably perspiring due to the high temperature, when he/she sits down in the vehicle. As a result, the surface between the driver/passenger and the seat bottom gets humid, which may be unpleasant. Thanks to the permeable surface layer, drops of moisture penetrate down into the surface ducts or are entrained into the same by means of the fan 6. These drops of moisture are then entrained by the air flow C to the branch ducts and subsequently to the underside of the seat and thus removed from the sitting surface. This phase is thus referred to as the moisture phase (see FIG. 4). Owing to the fact that all air is substantially conveyed through the surface ducts 3, since the joint ducts 4 have been closed, a more efficient removal of moisture is provided from the sitting surface than if the joint ducts 4 had been open due to the great air flow. In addition, the power of the fan can be substantially constant during the temperature phase and the moisture phase. The length of this phase can be regulated by means of a moisture sensor or be time-controlled. As indicated in FIG. 4, this phase can, for instance, last about 30 minutes to provide a sufficient removal of moisture from the surface.

However, during the moisture phase the fan 6 must have a high speed in order to have the capability of absorbing both air and moisture through the seat bottom. The draught which then occurs at the seat bottom is not healthy for the driver/passenger in the long run. Therefore, there is a third phase after the moisture phase, referred to as the comfort phase (see FIGS. 3 and 4), in which phase the speed of the fan is reduced to provide a comfortable cooling of the seat without any associated unpleasant and unhealthy draught. As a result, a ventilation system is provided, which regulates and controls the flow through the seat and thus provides a combined cooling and dehumidification of the seat (see FIG. 4).

It will be understood that a number of modifications are possible of the above-described embodiment of the invention within the scope of the invention, as defined in the appended claims. In the shown embodiment, certain ducts are, for instance, closed when a load is applied to the seat by mechanical compression of certain ducts. This closure can also be provided by means of valves or the like which are connected to sensors and which can be mounted in the joint ducts 4 or in the connection ducts 5 and provide a complete or partial closure of certain ducts when a load is applied to the seat bottom. Furthermore, the number of ducts and their positions may vary.

It should also be mentioned that the fan element can be arranged to either absorb air through the seat or blow air through the seat. These two modes can also be used alternately, for instance during different phases, which may be advantageous in certain applications.

In the above-described embodiment, the transitions between the different phases take place automatically, but these transitions can of course also, exclusively or in combination, be controllable manually to permit a regulation of the ventilation device according to personal wants and needs.

Finally, said surface ducts can completely or partially be made in the form of a permeable layer, which extends over the seat surface and in which said main ducts and joint ducts end. The use of such a layer, for instance, permits air to be absorbed over the entire surface of the seat, when the fan is in a suction mode, and then conveyed in the permeable layer to a suitable main or joint duct. This may result in a more even cooling result.

What is claimed is:

1. A vehicle seat including at least one seat part and a ventilation system, the at least one seat part including a seat bottom, the ventilation system comprising:
a network of ducts disposed in at least one seat part, at least one of the ducts being at least partially closeable and adapted to redirect air flow from the at least one partially closeable duct through at least one other duct of the network of ducts in the at least one seat part when a load is applied to the seat.

2. The vehicle seat of claim 1, wherein the network of ducts comprises ducts extending substantially in a planar direction of the at least one seat part, and ducts extending substantially in a thickness direction of the at least one seat part.

3. The vehicle seat of claim 2, wherein the network of ducts includes at least one branch duct extending substantially through the at least one seat part in the thickness direction.

4. The vehicle seat of claim 3, wherein the at least one branch duct is centrally disposed in the at least one seat part.

5. The vehicle seat of claim 3, wherein the at least one, at least partially closable duct comprises a plurality of joint ducts extending substantially in the thickness direction of the at least one seat part, the joint ducts each having one end intersecting a duct near a sitting surface of the at least one seat part, and another end intersecting a different duct.

6. The vehicle seat of claim 5, wherein the network of ducts includes at least one surface duct at least a part of which extends substantially in the planar direction of the sitting surface of the at least one seat part, the at least one surface duct having one end leading into the at least one branch duct, and the at least one surface duct being disposed such that the one end of each of the joint ducts disposed near the sitting surface of the at least one seat part, ends in the at least one surface duct.

7. The vehicle seat of claim 6, further comprising a permeable surface layer extending over substantially the entire sitting surface of the at least one seat part.

8. The vehicle seat of claim 6, wherein the at least one seat part comprises a cellular plastic material, the area of the at least one surface duct comprises a rigid material, and the area of the joint ducts and the area of the connection ducts comprise a soft material, the connection ducts being at least partially compressed when a load is applied to the at least one seat part.

9. The vehicle seat of claim 5, wherein the ends of the joint ducts facing away from the sitting surface of the at least one seat part are connected by connection ducts, the connection ducts extending substantially in the planar direction of the at least one sitting surface.

10. The vehicle seat of claim 2, further comprising a plurality of valves, at least one valve being disposed in each of the joint ducts for at least partially closing the joint ducts when a load is applied to the at least one seat part.

11. The vehicle seat of claim 3, further comprising a fan element arranged in fluid contact with the at least one branch duct, the fan element being disposed on a side opposite a sitting surface of the at least one seat part.

12. The vehicle seat of claim 11, wherein the fan element is configured to exhaust air from the sitting surface of the at least one seat part, through the network of ducts, and to the side opposite the sitting surface of the at least one seat part.

13. A method of comfort ventilation of a vehicle seat having at least one seat part, including a seat bottom (1), the at least one seat part (1) comprising a ventilation system including a network of ducts (2,3,4,5), a subset of the ducts (4,5) being at least partially closeable and adapted to redirect air flow from the subset of partially closeable ducts through at least one other subset of ducts of the network of ducts in the at least one seat part, comprising the steps of:
starting by remote control a fan element (6) which is arranged in connection with the seat part (1),
generating by means of said fan element (6) a flow of air through a network of ducts (2,3,4,5) which is arranged in the at least one seat part and whose orifices are distributed over the sitting surface, and
closing at least partially a subset of said ducts (4), and thus redirecting the air flow through at least one other subset of ducts of the network of ducts in the at least one seat part (1) when applying a load to the seat part (1).

14. A method as claimed in claim 13, wherein the step of completely or partially closing certain ducts is carried out by compressing the seat part (1) when applying a load, thereby causing mechanical changes in the structure of the seat bottom.

15. A method as claimed in claim 13, wherein the step of at least partially closing a subset of ducts is carried out by compressing connection ducts (5) arranged in the seat part (1) when applying a load.

16. A method as claimed in claim 13, wherein the step of generating by means of said fan element (6) a flow of air through a network of ducts (2, 3, 4, 5) arranged in the seat part consists in exhausting air from the sitting surface of the seat part (1), through said network of ducts (2, 3, 4, 5), whose orifices are distributed over the sitting surface, to the opposite side of the seat part (1).

17. A method as claimed in claim 13, further comprising the step of:

varying the speed of the fan (6) after the closing step to generate a comfortable air flow through the seat part (1).

18. The method of claim 13, wherein the step of starting the fan element by remote control is carried out by a start function of the fan element, the start function being connected to at least one of a remote key of the vehicle, a vehicle door handle, and an alarm device.

19. The vehicle seat of claim 1, wherein the at least one seat part is the seat bottom.

20. The vehicle seat of claim 1, wherein the at least one at least partially closable duct is at least partially compressed when a load is applied to the seat.

* * * * *

UNITED STATES PATENT AND TRADEMARK OFFICE
CERTIFICATE OF CORRECTION

PATENT NO.   : 6,578,910 B2
DATED        : June 17, 2003
INVENTOR(S)  : Christer Andersson, Bengt Andreasson and Harry Eriksson It is certified that error appears in the above-identified patent and that said Letters Patent is hereby corrected as shown below:

<u>Column 6,</u>
Line 25, delete "2" and insert therefor -- 9 --.

Signed and Sealed this

Twenty-first Day of October, 2003

JAMES E. ROGAN
*Director of the United States Patent and Trademark Office*